United States Patent
Murakami (12)

(10) Patent No.: US 6,269,984 B1
(45) Date of Patent: Aug. 7, 2001

(54) DISPENSING STOPPER FOR A BOTTLE

(75) Inventor: Yasuhiro Murakami, Oxford, MS (US)

(73) Assignee: The Thermos Company, Schaumburg, IL (US)

( * ) Notice: Subject to any disclaimer, the term of this patent is extended or adjusted under 35 U.S.C. 154(b) by 0 days.

(21) Appl. No.: 09/437,995

(22) Filed: Nov. 10, 1999

(51) Int. Cl.$^7$ .................................................. A47G 19/00
(52) U.S. Cl. .................. 222/472; 222/131; 222/511; 222/518; 222/505
(58) Field of Search .................. 222/478, 481, 222/481.5, 482, 542, 509, 518, 131, 470, 472, 511, 505

(56) References Cited

U.S. PATENT DOCUMENTS

| | | | |
|---|---|---|---|
| 2,363,693 | * 11/1944 | Robinson | 222/542 |
| 3,561,632 | * 2/1971 | Shirae et al. | 215/74 |
| 3,799,408 | 3/1974 | Palmer . | |
| 4,351,451 | 9/1982 | Chung . | |
| 4,648,535 | 3/1987 | Zimmermann . | |
| 4,671,436 | 6/1987 | Hagan . | |
| 4,676,411 | 6/1987 | Simasaki . | |
| 4,768,664 | 9/1988 | Zimmermann . | |
| 4,942,976 | 7/1990 | Spencer . | |
| 5,037,015 | 8/1991 | Collins . | |
| 5,240,145 | 8/1993 | Hogberg . | |
| 5,265,767 | 11/1993 | Gustafson . | |
| 5,497,917 | 3/1996 | Krimmel et al. . | |
| 5,615,808 | 4/1997 | Huang . | |
| 5,653,362 | 8/1997 | Patel . | |
| 5,911,345 | * 6/1999 | Castleberry | 222/482 |
| 5,947,343 | * 9/1999 | Horstmann | 222/474 |

* cited by examiner

Primary Examiner—Kevin Shaver
Assistant Examiner—Frederick Nicolas
(74) Attorney, Agent, or Firm—Wood, Phillips, VanSanten, Clark & Mortimer

(57) ABSTRACT

Internal, liquid flow passages in a dispensing stopper which might accumulate residue from the liquid being dispensed are eliminated in a structure including a stopper base (24) adapted to be mounted on the mouth (12) of a bottle (10). A seal (64) is mounted on the base (24) and includes a fixed section (66) affixed to the base (24), a movable gasket section (38) movable toward and away from the stopper base (24) and away and toward a sealing surface (16) on a bottle (10) on which the base (24) is mounted, and an integral, thin web (76) of resilient material peripherally interconnecting and sealing the fixed section (66) and the movable gasket section (38). An actuator attachment section (52) is affixed to the movable gasket section (38) and a lever (36) is pivoted to the base (24) and to the actuator attachment section (52) at spaced locations.

9 Claims, 4 Drawing Sheets

DISPENSING STOPPER FOR A BOTTLE

FIELD OF THE INVENTION

This invention relates to a dispensing stopper for a bottle, and more specifically, to a dispensing stopper for a bottle such as a carafe and which is characterized by the absence of flow passages in the stopper itself which would require periodic cleaning.

BACKGROUND OF THE INVENTION

Bottles of various sorts have long been provided with stoppers which seal the bottle when a liquid contained therein is not to be dispensed. Many such stoppers, as, for example, conventional bottle caps, are not replaceable and cannot be reinstalled on the bottle when the contents of the bottle have only been partially consumed. Other stoppers are simply screw on caps which must be totally separated from the bottle when its contents are to be dispensed. Because such stoppers are completely separated from the bottle when the bottle is opened, not infrequently the stopper may be lost making it impossible to reseal the bottle or requiring resort to some other type of closure device. Moreover, because extensive manipulation of the cap is required, opening and closing the bottle is not as convenient as might otherwise be the case.

To avoid these and other problems, a variety of dispensing stoppers have been suggested. These types of stoppers are typically removably fixed to the bottle to be sealed and require only the application of an opening force to a lever or the like to cause the stopper to unseal the bottle when its contents are to be dispensed. While these stoppers work well in the sense that they do not require extensive manipulation to seal or unseal the bottle, they are not without drawbacks of their own. Typical of these stoppers is an internal conduit that is in fluid communication with the interior of the bottle as well as the exterior of the bottle as, for example, at a pouring spout. When these stoppers are placed in the environment where they are required to be reused, it is necessary to thoroughly clean the interior conduit to assure that liquid passing therethrough in a prior use has not left any residue. Such residue, depending upon the contents of the bottle, could provide a source for the growth of bacteria, or result in the contents of the bottle being dispensed through the stopper in a subsequent use having a flavor imparted thereto that may be undesirable as a result of it being of a different liquid than that being dispensed or simply as a result of degradation occurring to the residue while in the internal conduit.

In any case, careful washing of the stopper may be required to assure that there is no residue remaining within the internal conduit from previous pours in such stopper. And because the conduit is internal to the stopper, and will typically be provided with some sort of valving or flow control device, the opportunity for the accumulation of residue from liquids being dispensed is significant.

The present invention is directed to overcoming one or more of the above problems.

SUMMARY OF THE INVENTION

It is a principal object of the invention to provide a new and improved dispensing stopper for a bottle. More particularly, it is an object of the invention to provide such a stopper which eliminates the need for extensive cleaning of an internal, valved conduit within the stopper. It is also an object of the invention to provide a new and improved dispensing stopper of simple and economic construction.

An exemplary embodiment of the invention achieves the foregoing object in a dispensing stopper that includes a stopper base adapted to be mounted on the mouth of a bottle. A seal is mounted on the base and the seal includes a fixed section fixed to the base along with a movable gasket section movable toward and away from the stopper base and away and toward a sealing surface about the mouth on a bottle to which the base is to be mounted. The seal also includes an integral, thin web of resilient material peripherally interconnecting and sealing the fixed section and the movable section. An actuator attachment section is affixed to the movable section of the seal and a lever is pivoted to the base and to the actuator attachment section at spaced locations.

As a consequence of the foregoing, the application of a pivoting force to the lever will move the gasket section toward the fixed section to move the gasket section away from the mouth of a bottle on which the base is mounted to allow liquid to be poured from the bottle. The absence of the force allows the resiliency of the web to return the gasket section toward the mouth of a bottle on which the base is mounted to seal the same. Liquid flow is past the stopper, and specifically, the gasket section of the seal thereof, and not through the stopper at all or any valves located within internal passages within the stopper.

In a preferred embodiment of the invention, the lever is elongated with opposite ends. One of the ends includes a force receiving section and the other of the ends is pivoted to the actuator attachment section. The lever is pivoted intermediate its ends to the base.

In one embodiment, the base includes a radially inwardly directed circular flange and the actuator section includes a radially outward directed circular edge. The seal is a unitary ring of resilient elastomer with the fixed section having a radially outward opening groove sealingly receiving the flange and the gasket section having a radially inward opening groove sealing and receiving the edge of the actuator section.

In a preferred embodiment, the web interconnects the fixed and gasket sections at their peripheries.

In a highly preferred embodiment, the web interconnects the fixed and gasket sections at their radially outer peripheries.

One embodiment of the invention contemplates the provision of interengaging guides on the base and the attachment section to guide the attachment section in a path of reciprocating movement.

A preferred embodiment envisions that the attachment section include upstanding pivot blocks receiving a pivot pin on the lever other end.

A highly preferred embodiment includes a cap secured to the base and one of the cap and the base includes spaced saddles for receiving a pivot located intermediate the ends of the lever and the other of the cap and the base includes spaced projections aligned with and directed toward the saddles for holding the pivot in the saddles.

According to another facet of the invention, a preferred embodiment includes a cap on the base. A funnel-like structure is formed in the cap and extends to an opposite side of the stopper. In this configuration, the cap may be utilized with a carafe or the like for holding coffee. The same may be placed under a brewing machine to capture a stream of freshly brewed coffee in the funnel-like structure and direct the same to the interior of a bottle on which the base is mounted.

In one embodiment of the invention the funnel-like structure includes an inverted, somewhat conical surface at the top of the cap with a depending conduit extending through the attachment section. A further seal is located at the interface of the conduit and the attachment section.

The invention also contemplates a dispensing bottle having an internally threaded mouth and a pouring spout thereat. The mouth has a peripheral sealing surface inwardly of the threaded mouth. A stopper such as mentioned before includes threads on the base which are threaded into the threaded mouth to mount the base on the bottle. The gasket section of the seal normally sealingly engages the peripheral sealing surface about the mouth of the bottle.

Other objects and advantages will become apparent from the following specification taken in connection with the accompanying drawings.

DESCRIPTION OF THE PREFERRED EMBODIMENTS

Figure 1:
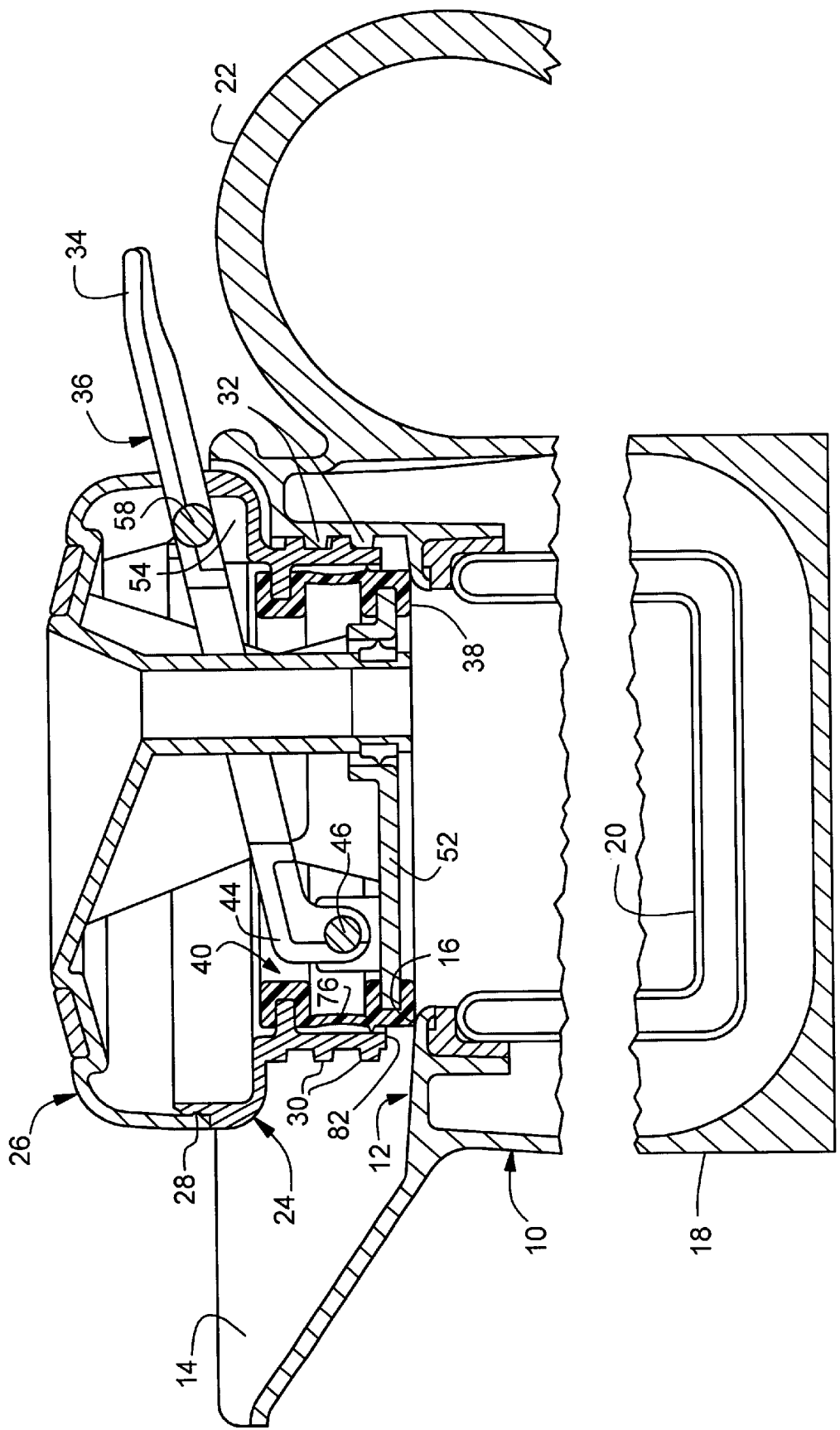
FIG. 1 is a fragmentary, vertical section of a stopper made according to the invention and mounted on a bottle.

An exemplary embodiment of a dispensing stopper made according to the invention is illustrated in FIG. 1 as mounted on a bottle, generally designated 10. As illustrated, the bottle 10 has an upper mouth 12 terminating in a pouring spout 14. Surrounding the mouth 12 is a circular, sealing surface 16.

The bottle 10 includes an outer shell 18 made of a rigid, typically plastic, material. However, metal materials or glassware may be utilized if desired. Within the shell 18 is a vacuum bottle 20 of conventional construction which is mounted to the shell 18 in any conventional fashion. Oppositely of the pouring spout 14, the shell 18 includes a handle 22. The stopper includes a rigid plastic base generally designated 24 to which is mounted a decorative, rigid plastic cap, generally designated 26. A snap fit in the area shown at 28 is employed to interconnect the two.

The base 24, at its lower end, includes peripheral threads 30 by which the stopper may be threaded onto internal threads 32 within the mouth 12 of the bottle 10. Preferably, the threads are configured so that when the stopper is fully threaded into the mouth 12, the force receiving end 34 of a lever, generally designated 36, directly overlies the handle 22. In this way, an operating force to the stopper may be applied to the force receiving end 34 by one thumb when one grips the handle 22 for ease of dispensing.

As can be seen in FIG. 1, the gasket section 38 of a circular, resilient seal, generally designated 40, seals against the sealing surface 16 to seal the contents of the bottle 10.

Figure 2:
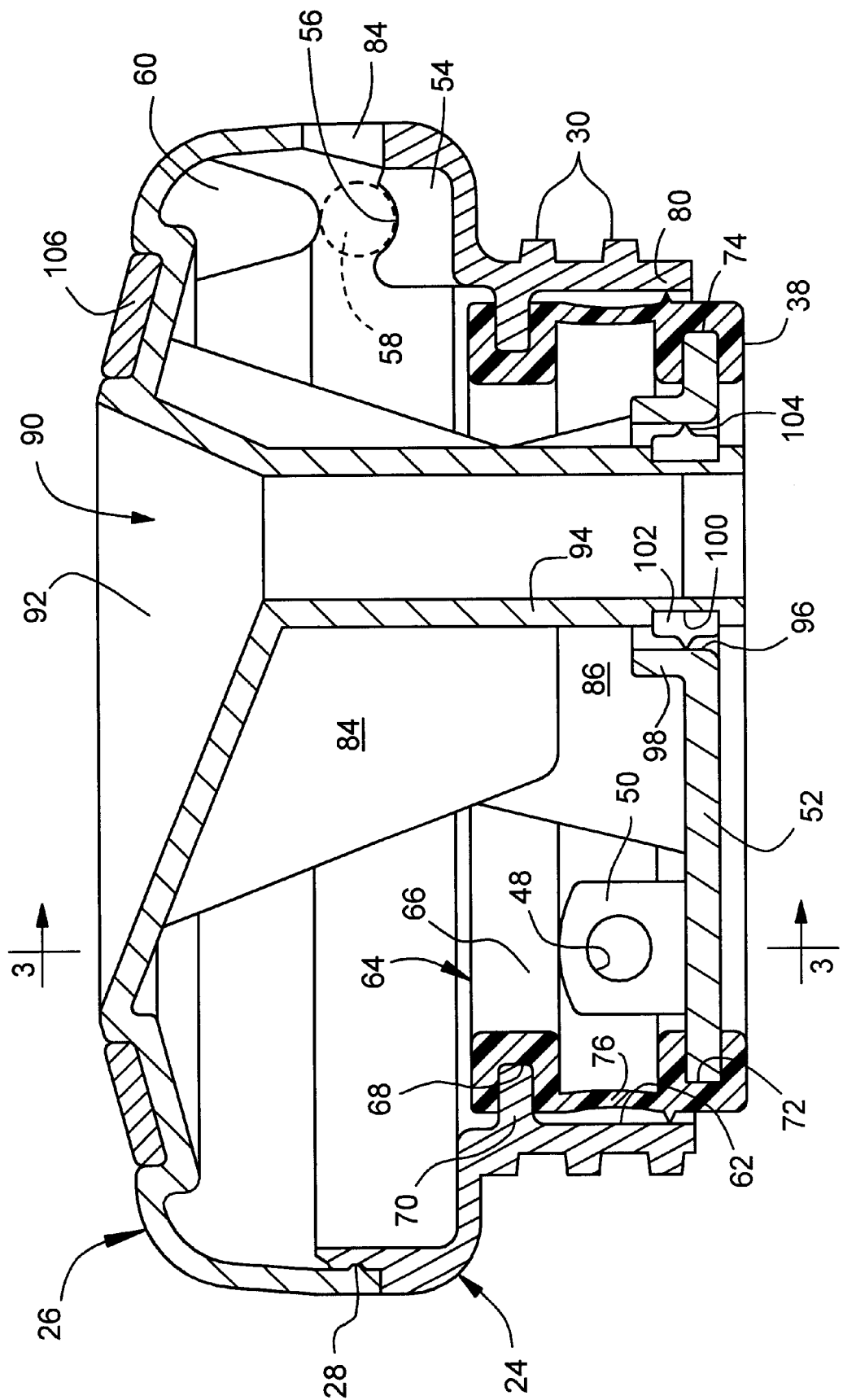
FIG. 2 is an enlarged, sectional view of the stopper with parts removed for clarity.

Referring to FIGS. 1 and 2, the lever 36 includes an end 44 opposite the force receiving end 34. The end 44 includes a pivot pin 46 which is pivotably received in a pivot aperture 48 located in each of a pair of upstanding pivot blocks 50. The pivot blocks 50 are mounted on an actuator attachment section 52 of the stopper to be described in greater detail hereinafter. Oppositely of the center line of the stopper from the pivot blocks 50, the base 24 includes a pair of spaced upstanding saddles 54 having upwardly facing rounded grooves 56. A pivot pin 58 (shown only in dotted lines in FIG. 2) is seated in the grooves 56 and is secured to the lever 36 intermediate the ends 34 and 44. The cap 26 includes a pair of downwardly extending projections 60 which are aligned with and spaced from the grooves 56 but serve to locate and maintain the pivot pin 58 therein so as to pivot the lever 36, intermediate its ends to the stopper base 24.

The base 24 has a cylindrical, downwardly facing cavity 62 to receive a seal, generally designated 64, of which the gasket section 38 is a part. The seal 64 is a generally ring-like, unitary, elastomeric seal formed of silicone rubber or the like. It includes an upper, fixed section 66 which in turn is provided with a radially outward opening, peripheral groove 68. A radially inward directed flange 70 on the base 24 is received within the groove 68 to mount the seal 64 within the stopper base 24.

The seal 64 also includes the gasket section 38 as mentioned previously. The gasket section 38 includes a peripheral, radially inward opening groove 72 which receives the generally circular edge 74 of the actuator attachment section 52.

Figure 3:
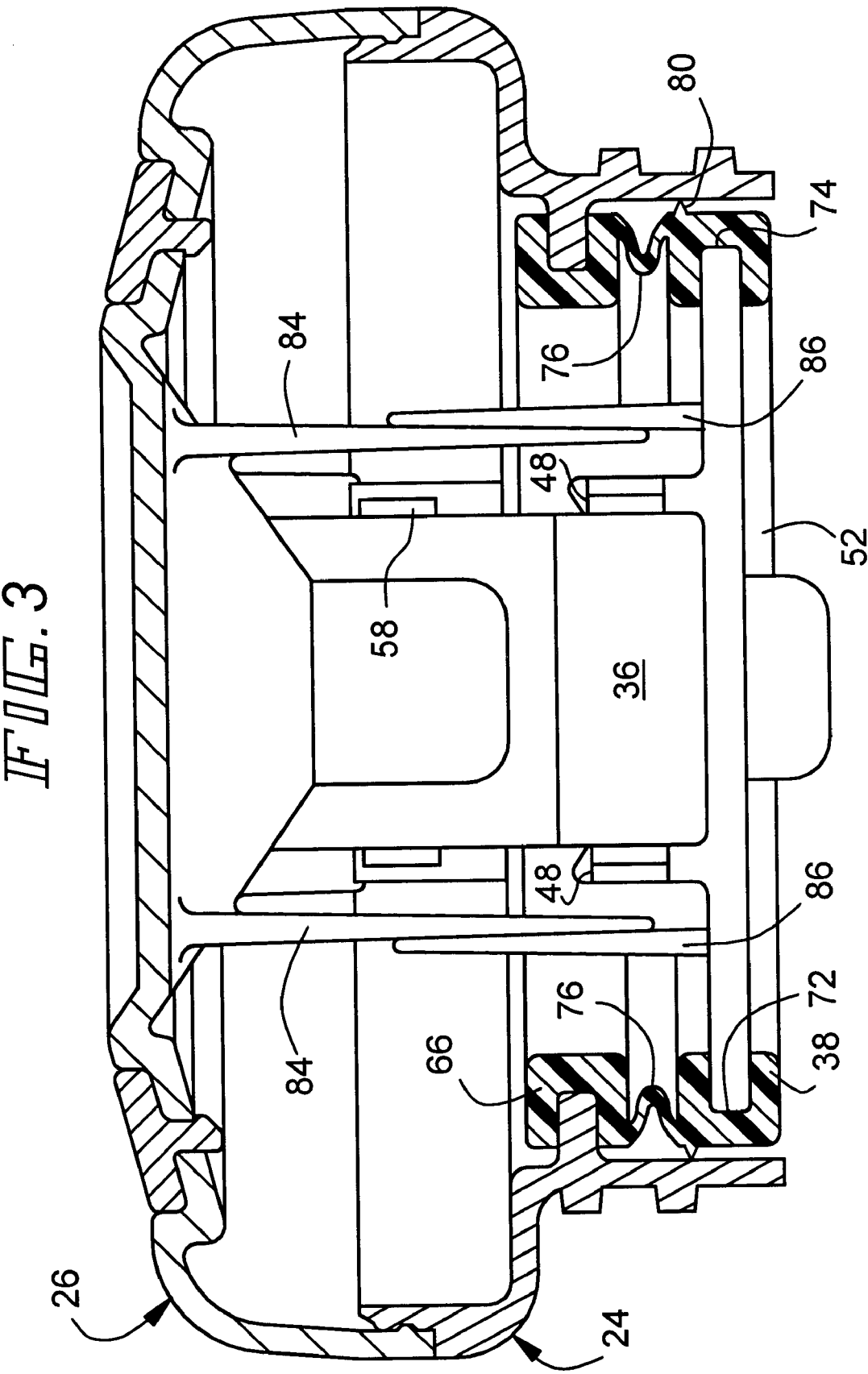
FIG. 3 is a vertical section of the stopper taken approximately along the line 3—3 in FIG. 2.

Interconnecting the fixed section 66 and the gasket section 38 is a peripheral, integral, thin web 76 which extends between the outer peripheries of both fixed sections 66 and the gasket section 38. The web 76 seals the two together and serves, by reason of its inherent resilience, as a spring to urge the gasket section 38 against the sealing surface 16 as shown in FIG. 1. At the same time, it serves a yieldable connection between the two sections 38, 66 so that a downward force applied to the force receiving end 34 of the lever 36 will cause the lever 36 to pivot about the pivot 58 thereby raising the attachment section 52. Since the edge 74 of the attachment section 52 is captured within the grooves 72 in the gasket section 38, the latter will be raised and withdrawn into a position within the stopper as shown, for example, in FIG. 3. As can be seen in FIG. 3, in this location, the web 76 collapses radially inwardly to allow the gasket section 38 to move toward the fixed section 66. This also causes the gasket section 38 to separate from the sealing surface 16 to in turn allow liquid within the bottle 10 to be dispensed. When pressure on the force receiving end 34 of the lever 36 is released, the web 76 will tend to return to the configuration illustrated in FIGS. 1 and 2 to resiliently urge the gasket section 38 downwardly and back into sealing engagement with the sealing surface 16 in the mouth 12. To prevent the entry of liquid from the bottle into the interior of the stopper when pouring, the gasket section 38 also includes a radially outwardly directed, peripheral nib 80 which sealingly engages the cylindrical interior wall 64 of the base 24.

From the foregoing, it will be appreciated that the stopper is readily removed or replaced on the bottle 10 as desired. It will also be appreciated that it need not be removed between pourings. Even more importantly, it will be appreciated that when the gasket section 38 is raised by application of a force to the force receiving end 34 of the lever 36, liquid within the bottle 10 may pass from the mouth of the bottle under the lowermost edge 82 of the stopper without going through any internal passages within the stopper. The structure is exceedingly simple in that a single seal 40, in the preferred embodiment, acts as a seal, a valve, and a spring for biasing the gasket section 38 against the sealing surface 16 of the bottle 10.

As seen in FIG. 2, the base 24 includes an opening 84 through which the force receiving end 34 of the lever 36 may project. Since the cap 26 is snap fit as at 28 to the base 24, and to guide the attachment section 52 in a vertical path of reciprocating movement, spaced, downwardly extending projections 84 may be located on the cap to slidably engage spaced, upwardly extending projections 86 on the attachment section 52. The projections 84, 86 are flat and thus prevent relative rotation of the cap 26 on the base 24 as well as serving as guide means for the reciprocating movement of the gasket section 38.

In some instances, particularly when the bottle is to be used as a carafe for coffee or the like, the cap 26 may have a funnel-like structure, generally designated 90, associated therewith. The funnel-like section 90 includes an upper, inverted, generally conical surface 92 centrally thereof which merges with a downwardly extending conduit 94 which extends all the way to the opposite side of the stopper. The conduit 94 is in fluid communication with the inverted, conical surface 92. As a consequence of this construction, a carafe, with the stopper in place, can be disposed within a brewing machine or the like to receive descending, freshly brewed coffee which will then be directed to the interior of the bottle 10. The funnel-like structure 90 is optional but when present, the attachment section 52 is provided with an opening 96 surrounded by an upstanding flange 98 which surrounds, in spaced relation, the conduit 94. The conduit 94, in turn, is provided with an outwardly opening peripheral groove 100 on its exterior side which receives a gasket 102. The gasket 102, like the gasket section 38, includes a peripheral, radially outward directed nib 104 which sealingly engages the interior of the upstanding flange 98 as the attachment section 52 moves toward and away from a bottle on which the stopper is mounted.

Finally, if desired, the cap 26, circumferentially around the conical surface 92, may be provided with a slidable, circumferentially adjustable indicating ring 106 which may contain indicia (not shown) to indicate contents of the bottle with which the stopper is associated.

Figure 4:
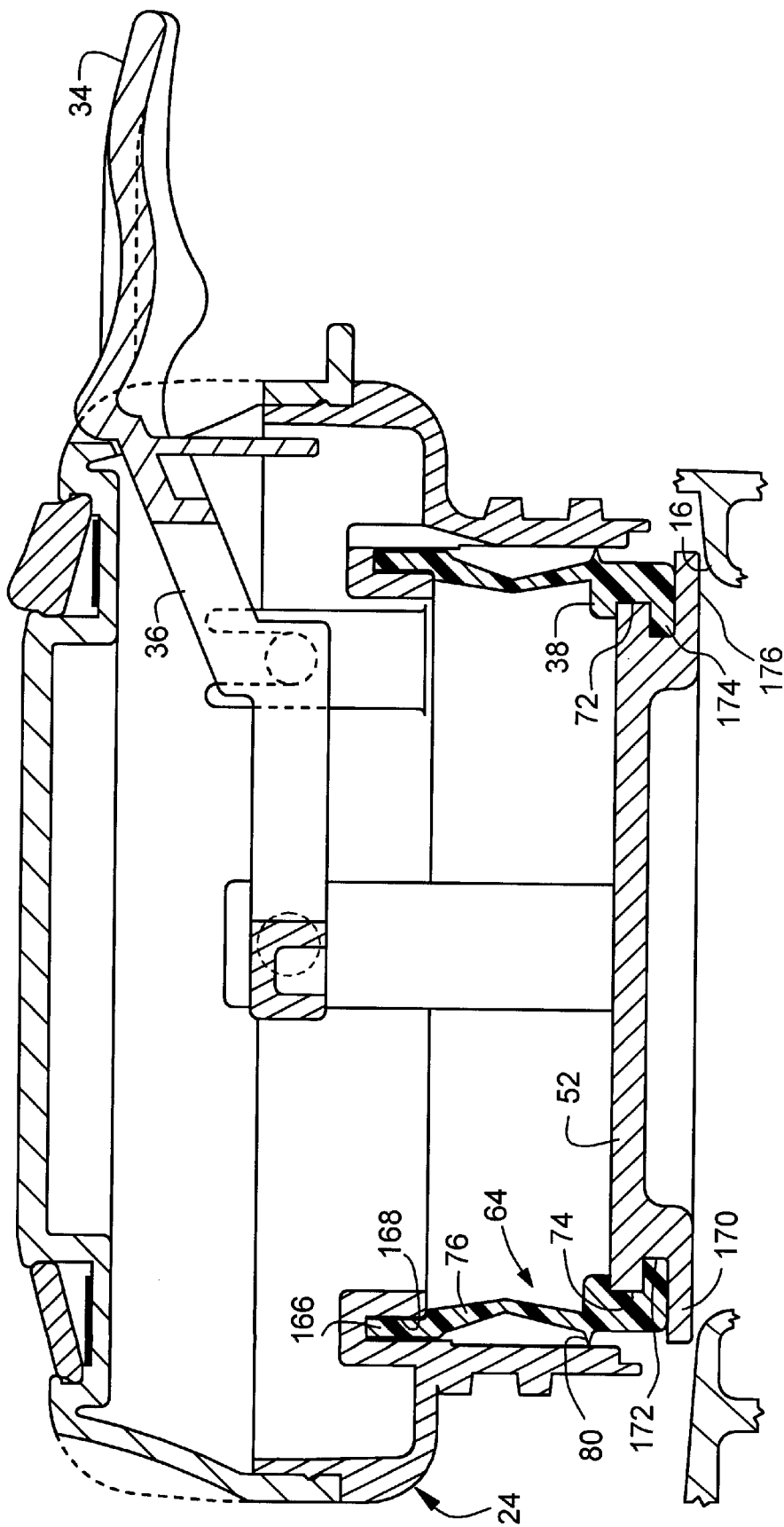
FIG. 4 is a view similar to FIG. 2 but of a modified embodiment.

A modified embodiment of the invention is illustrated in FIG. 4. It will be readily recognized that the same is quite similar to the embodiment illustrated in FIGS. 1–3. The embodiment illustrated in FIG. 4 lacks the funnel like structure 90 but could be provided with the same if desired.

In any event, the principal difference between the embodiment of FIG. 3 and the embodiment of FIG. 4 is in the relationship between the seal 64 and the actuator attachment section 52. As in the case of the embodiment illustrated in FIGS. 1–3, the seal 64 has a fixed section 166 which is generally cylindrical and is received in a cylindrical notch 168 in the base 24. The seal 64 includes a gasket section 38 which is again provided with a radially inward opening groove 72 which receives a generally circular edge 74 of the actuator attachment section 52. Interconnecting the fixed section 166 and the gasket section 38 is a peripheral, integral thin web 76 as in the prior embodiment which seals the two together and by reason of its inherent resilience acts as a spring to urge the gasket section 38 toward the sealing surface 16 of a bottle. At the same time, it serves as a yieldable connection between the two sections 38, 166 so that a downward force applied to the force receiving end 34 of the lever 36 will cause the lever 36 to pivot, thereby raising the attachment section.

The attachment section 52 includes a second peripheral edge 170 which is of greater diameter than the edge 74 and which is spaced there below by a radially outwardly opening groove 172 which receives an inwardly directed leg 174 at the bottom of the gasket section 38. In this case, the edge 170 defines the periphery of a valve surface 176 on the attachment section 52 which seals against the sealing surface 16. In other words, in the embodiment illustrated in FIG. 4, the seal is between the sealing surface 16 and the attachment section 52 whereas in the embodiment of FIGS. 1–3, the seal is between the lower part of the gasket section 38 and the sealing surface 16.

In the embodiment illustrated in FIG. 4, because the actuator section 52 may be made of relatively hard material, the sealing surface 176 is less prone to damage during handling.

Again, the peripheral nib 80 is provided on the gasket section 38 for the same purposes as mentioned previously.

From the foregoing, it will be appreciated that a dispensing stopper made according to the invention is simply utilized just as prior dispensing stoppers simply by the application of a force through the force receiving end 34 of the lever 36. At the same time. However, a stopper made according to the invention includes no interior valve or passages which could accumulate residue from the liquid being dispensed and thereby require extensive washing between usages. Moreover, the invention is extremely simple and economical to form. In terms of simplicity, the unitary seal 64 provides not only sealing, but valving and biasing functions and substantially eliminates parts and assembly procedures associated with the assembly of many parts. The presence of the funnel-like structure 90 allows the same to be utilized directly in a coffee making machine or the like to further simplify the usage of a bottle with which the stopper may be associated.

What is claimed is:

1. A dispensing stopper for a bottle comprising:

a stopper base adapted to be mounted on the mouth of a bottle;

a unitary seal of elastomer mounted on said base, said seal including a fixed section fixed to said base, a movable gasket section movable toward and away from said stopper base and away and toward a sealing surface about the mouth on a bottle to which said base is mounted, and a thin, web of resilient material interconnecting and sealing said fixed section and said movable gasket section;

an actuator attachment section affixed to said movable gasket section, and including a valve surface adapted to seal about the mouth of a bottle;

said movable gasket section including a radially inward opening groove and said actuator attachment section including two spaced radially outwardly directed peripheral edges, a first of said edges being received in said groove and the other of said edges defining the periphery of said valve surface; and a lever pivoted to said base and to said actuator section at spaced locations;

whereby application of a pivoting force to said lever will move said gasket section toward said fixed section to move said gasket section away from the mouth of a bottle on which said base is mounted and the absence of said force will allow the resiliency of said web to return said gasket section toward the mouth of a bottle on which said base is mounted.

2. The stopper of claim 1 wherein said movable gasket section is located between said other edge and said fixed section.

3. A dispensing stopper for a bottle, comprising:

a stopper base adapted to be mounted on the mouth of a bottle;

a unitary seal of elastomer mounted on said base, said seal including a fixed section fixed to said base, a movable gasket section movable toward and away from said stopper base and away and toward a sealing surface about the mouth on a bottle to which said base is mounted, and a thin, web of resilient material interconnecting and sealing said fixed section and said movable gasket section;

an actuator attachment section affixed to said movable gasket section;

said base including a radially inward directed circular flange and said actuator section including a radially outward directed circular edge, and said seal being a unitary ring of resilient elastomer with said fixed section having a radially outward opening groove sealingly receiving said flange and said gasket section having a radially inward opening groove sealingly receiving said edge; and a lever pivoted to said base and to said actuator attachment section at spaced locations;

whereby application of a pivoting force to said lever will move said gasket section toward said fixed section to move said gasket section away from the mouth of a bottle on which said base is mounted and the absence of said force will allow tie resiliency of said web to return said gasket section toward the mouth of a bottle on which said base is mounted.

4. The stopper of claim 3 wherein said web interconnects said fixed and gasket sections at their peripheries.

5. The stopper of claim 3 wherein said web interconnects said fixed and gasket sections at their radially outer peripheries.

6. The stopper of claim 3 further including a cap secured to said base and one of said cap and said base includes spaced saddles for receiving a pivot located intermediate said ends of said lever and the other of said cap and said base includes spaced projections aligned with and directed toward said saddles for holding said pivot in said saddles.

7. A dispensing stopper for a bottle, comprising:

a stopper base adapted to be mounted on the mouth of a bottle;

a unitary seal of elastomer mounted on said base, said seal including a fixed section fixed to said base, a movable gasket section movable toward and away from said stopper base and away from said stopper base and away and toward a sealing surface about the mouth on a bottle to which the base is mounted and adapted to seal about the mouth of a bottle, and a thin, web of resilient material interconnecting and sealing said fixed section and said movable gasket section;

an actuator attachment section affixed to said movable gasket section;

a lever pivoted to said base and to said actuator attachment section at spaced locations; and a cap secured to said base, one of said cap and said base including spaced saddles for receiving a pivot located intermediate said ends of said lever and the other of said cap and said base including spaced projections aligned with and directed toward said saddles for holding, said pivot in said saddles;

whereby application of a pivoting force to said lever will move said gasket section toward said fixed section to move said gasket section away from the mouth of a bottle on which said base is mounted and the absence of said force will allow the resiliency of said web to return said gasket section toward the mouth of a bottle on which said base is mounted.

8. A dispensing stopper for a bottle, comprising:

a stopper base adapted to be mounted on the mouth of a bottle;

a unitary seal of elastomer mounted on said base, said seal including a fixed section fixed to said base, a movable gasket section movable toward and away from said stopper base and away and toward a sealing surface about the mouth on a bottle to which said base is mounted, and a thin, web of resilient material interconnecting and sealing said fixed section and said movable gasket section;

an actuator attachment section affixed to said movable gasket section;

a lever pivoted to said base and to said actuator attachment section at spaced locations;

a cap on said base; and a funnel-like structure formed in said cap and extending to an opposite side of said stopper;

whereby application of a pivoting force to said lever will move said gasket section toward said fixed section to move said gasket section away from the mouth of a bottle on which said base is mounted and the absence of said force will allow the resiliency of said web to return said gasket section toward the mouth of a bottle on which said base is mounted.

9. The stopper of claim 8 wherein said funnel-like structure includes an inverted, somewhat conical surface at the top of said cap with a depending conduit extending through said attachment section; and a further seal at the interface of said conduit and said attachment section.

* * * * *